UNITED STATES PATENT OFFICE.

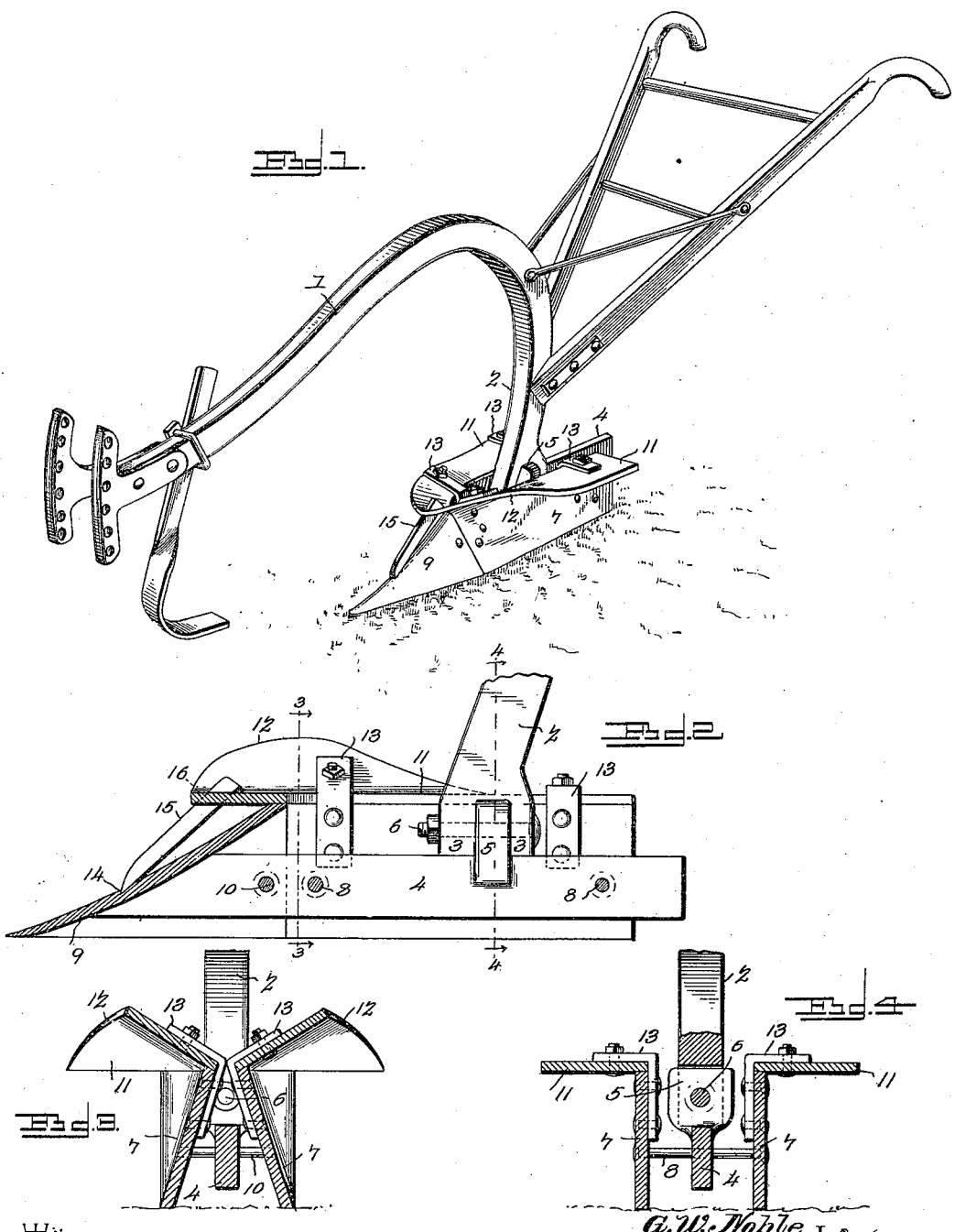

GEORGE W. NOBLE AND CARY M. KEETON, OF COLLBRAN, COLORADO.

PLOW.

SPECIFICATION forming part of Letters Patent No. 662,131, dated November 20, 1900.

Application filed June 25, 1900. Serial No. 21,532. (No model.)

*To all whom it may concern:*

Be it known that we, GEORGE W. NOBLE and CARY M. KEETON, citizens of the United States, residing at Collbran, in the county of Mesa and State of Colorado, have invented a new and useful Plow, of which the following is a specification.

Our invention is an improved plow for use in irrigated alfalfa lands.

The object of our invention is to provide an improved plow which is efficient for use in irrigated alfalfa lands and which in operation levels the ground, so as to facilitate the operation of mowing-machines thereon in the subsequent cutting of the alfalfa.

Our invention consists in the peculiar construction and combination of devices hereinafter fully set forth, and pointed out in the claims.

In the accompanying drawings, Figure 1 is a perspective view of a plow constructed in accordance with our invention. Fig. 2 is a longitudinal sectional view of the same. Fig. 3 is a vertical transverse sectional view taken on the line 3 3 of Fig. 2. Fig. 4 is a similar view taken on the line 4 4 of Fig. 2.

The plow-beam 1 is bifurcated at the lower end of the downcurved standard portion 2 thereof to form ears 3. A longitudinally-disposed bar 4 is provided on its upper side with a transversely-disposed lug 5, which fits between the ears 3 and is secured between the same by a bolt 6, whereby the bar 4 is firmly secured to the lower end of the standard and adapted to be detached therefrom. On opposite sides of the bar 4 at a suitable distance therefrom are a pair of parallel landsides 7, the faces of which for the greater portion of the length thereof are disposed in vertical planes. The said landsides are secured to the bar 4 by any suitable means. In the drawings we show tie-bolts 8, which serve to secure the landsides 7 to the bar 4. The share 9 is double-faced, and the sides thereof are inclined and converge upwardly. The said share is secured on the front end of the bar 4 and held in position thereon by any suitable means, a tie-bolt 10 being here shown to thus secure the share. The share forms a wedge which conducts to the parallel landsides, and by reason of the upwardly-converging faces thereof the share tends to bury itself in the soil when the plow is in operation. A pair of laterally-projecting wings 11 are disposed on the upper sides of the landsides and extend outward therefrom. The rear portions of the said wings are horizontally disposed, and the front portions thereof, which are united and disposed over the rear portion of the share, are upwardly inclined in the form of sinusoidal curves, which unite with the horizontally-disposed rear portions of the wings. In operation the upwardly-curved front portions 12 of the wings compress the earth downward which is displaced by the plow, and the horizontally-disposed rear portions of the wings level the soil, so that the same is left smooth by the plow to facilitate the operation of mowing-machines in the cutting of the alfalfa. The wings 11 may be formed integrally or separately, as may be preferred, and the same may be secured on the landsides in any suitable manner. In the drawings we have shown right-angled bracket-bars 13, which are bolted to the inner sides of the landsides 7 and on top of the wings 11 and serve to secure the said wings on the landsides. The share 9 is provided in its crest or angle formed by the upwardly-converging faces thereof at a point about midway between the front and rear of the share with a recess 14, in which is seated the heel of a colter 15. The upper portion of the colter passes through and is secured in a slot 16 in the united front ends of the wings 11.

Having thus described our invention, we claim—

1. A plow having parallel landsides, a double-faced share, the sides of which converge upwardly, and laterally-projecting wings disposed above the landsides, substantially as described.

2. A plow having parallel landsides, a double-faced share, the sides of which converge upwardly, and laterally-projecting wings disposed above the landsides, the front ends of said wings being upwardly inclined and their rear portions being horizontally disposed, for the purpose set forth, substantially as described.

In testimony that we claim the foregoing as our own we have hereto affixed our signatures in the presence of two witnesses.

GEORGE W. NOBLE.
CARY M. KEETON.

Witnesses:
E. J. LUDLUM,
FRANK C. WILLIAMS.